US007952965B2

(12) United States Patent
Hoshino

(10) Patent No.: US 7,952,965 B2
(45) Date of Patent: May 31, 2011

(54) OPTICAL PICKUP DEVICE, OPTICAL PICKUP CONTROLLER AND OPTICAL PICKUP CONTROL METHOD

(75) Inventor: Takayuki Hoshino, Osaka (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 247 days.

(21) Appl. No.: 12/301,662

(22) PCT Filed: Aug. 30, 2007

(86) PCT No.: PCT/JP2007/066906
§ 371 (c)(1),
(2), (4) Date: Nov. 20, 2008

(87) PCT Pub. No.: WO2008/035555
PCT Pub. Date: Mar. 27, 2008

(65) Prior Publication Data
US 2009/0196151 A1 Aug. 6, 2009

(30) Foreign Application Priority Data
Sep. 20, 2006 (JP) .................................. 2006-254193

(51) Int. Cl.
*G11B 7/00* (2006.01)
(52) U.S. Cl. ................ 369/44.32; 369/44.23; 369/44.37; 369/53.19
(58) Field of Classification Search ................ 369/44.37, 369/44.32, 53.19, 44.23
See application file for complete search history.

(56) References Cited

U.S. PATENT DOCUMENTS

| 5,416,756 A | 5/1995 | Takeshita et al. ............... 369/32 |
| 6,434,096 B1 | 8/2002 | Akagi et al. ............... 369/44.32 |
| 6,594,091 B2 * | 7/2003 | Maeda et al. ................. 359/719 |

(Continued)

FOREIGN PATENT DOCUMENTS
CN 1598943 A 3/2005
(Continued)

OTHER PUBLICATIONS

Notification of Transmittal of Translation of the International Preliminary Report on Patentability and Written Opinion Translation mailed Apr. 2, 2009, concerning International Application No. PCT/JP2007/066906 filed on Aug. 30, 2007.

(Continued)

*Primary Examiner* — Wayne R Young
*Assistant Examiner* — Latanya Bibbins
(74) *Attorney, Agent, or Firm* — Sidley Austin LLP

(57) ABSTRACT

An optical pickup device such that the driving force of the drive unit provided on the same optical base as that of the objective lens exerts no adverse influence on controlling of the objective lens is provided. The optical pickup device 1 has an objective lens 11 that condenses laser light onto an optical disk 3, a first drive mechanism 15 that moves the objective lens 11 on the optical base 6, a second drive mechanism 8 that moves a movable member 9 different from the objective lens 11 on the optical base 6, first control means 27 that outputs a first driving signal TDS to operate the first drive mechanism 15, and second control means 25 that outputs a second driving signal EDS to operate the second drive mechanism 8. A derivative value of the second driving signal EDS is added to the first driving signal TDS and inputted to the first drive mechanism 15.

14 Claims, 3 Drawing Sheets

U.S. PATENT DOCUMENTS

| | | | | |
|---|---|---|---|---|
| 7,406,007 | B2 | 7/2008 | Kuze et al. | 369/44.32 |
| 2004/0218484 | A1* | 11/2004 | Kuze et al. | 369/44.23 |
| 2005/0047291 | A1* | 3/2005 | Kuze et al. | 369/44.32 |
| 2005/0237901 | A1* | 10/2005 | Shinozuka | 369/112.09 |

FOREIGN PATENT DOCUMENTS

| | | |
|---|---|---|
| EP | 1 017 044 A1 | 7/2000 |
| JP | 5-242501 A | 9/1993 |
| JP | 9-180203 A | 7/1997 |
| JP | 2004-145926 A | 5/2004 |
| JP | 2006-155717 A | 6/2006 |
| WO | WO 2008/035555 A1 | 3/2008 |

OTHER PUBLICATIONS

Supplementary European Search Report dated May 12, 2009 for counterpart European Application No. EP 07 80 6383.

Chinese Office Action dated May 4, 2010, for counterpart Chinese Application No. 200780023310,3, together with an English translation thereof.

Chinese Office Action dated Aug. 23, 2010, for counterpart Chinese Application No. 200780023310.3, together with an English translation thereof.

* cited by examiner

OPTICAL PICKUP DEVICE, OPTICAL PICKUP CONTROLLER AND OPTICAL PICKUP CONTROL METHOD

RELATED APPLICATIONS

This application is a National Stage of International Application No. PCT/JP2007/66906, filed with the Japanese Patent Office on Aug. 30, 2007, which is based on Japanese Patent Application No. 2006-254193.

FIELD OF THE INVENTION

The present invention relates to an optical pickup device, an optical pickup controller and an optical pickup control method.

BACKGROUND OF THE INVENTION

An optical pickup device used for an optical disk apparatus has on an optical base, a light emitting element that generates a laser light, an objective lens for condensing the laser light and applying the same onto an optical disk, and a light receiving element that receives reflected light from the optical disk. The optical base is positioned in the radial direction of the optical disk by a stepping motor driven feed screw or the like. Since the track of the optical disk slightly meanders, tracking to keep the position of application of the light on the track is performed by calculating a deviation from the track from the output of the light receiving element and moving the objective lens on the optical base.

When the optical base is moved by the feed screw, vibrations are applied to the optical base, and it is sometimes the case where the position of application of the light deviates from the target track (tracking error). Therefore, in the optical disk controller described in Patent Document 1, the influence of the vibrations of the optical base is suppressed by storing the vibratory waveforms expected to be applied to the optical base when the feed screw is driven by the stepping motor and increasing the gain of servo control of the tracking when vibrations are applied and correcting the set point of servo.

In this case, in order to allow the influence of the vibrations of the optical base to be reduced by gain adjustment of tracking control, the response of the tracking control must be sufficiently faster than the cycle of vibrations due to the feed screw. Moreover, complicated calculation attends to preparatorily store the vibratory waveforms due to the feed screw and to correct the control output of the tracking, and therefore, a high-speed processor is necessary.

Moreover, it is sometimes the case where an actuator to drive the lens for not only the tracking but also aberration correction is provided for the optical base of the optical pickup device. In this case, the optical base moves due to a reactive force of the driving of the actuator for the aberration correction, sometimes causing a tracking error.

The drive unit as described above provided for the optical base is a high-speed actuator generally coequal with the control speed of the objective lens. Therefore, gain adjustment cannot follow the movement, and the processing of reading the waveform stored in the memory takes excessive time, sometimes insufficiently functioning.

Patent Document 1: JP H09-180203 A

SUMMARY OF THE INVENTION

Problem to be Solved by the Invention

In view of the above problems, it is an object of the present invention to provide an optical pickup device such that a driving force of a drive unit provided for the same optical base as that of the objective lens exerts no adverse influence on the control of the objective lens.

Means for Solving Problem

In order to solve the above problem, the optical pickup device of the invention includes an objective lens that condenses laser light on an optical disk, a first drive mechanism that moves the objective lens on an optical base, a second drive mechanism that moves a movable member different from the objective lens on the optical base, first control means for outputting a first driving signal to operate the first drive mechanism, and second control means for outputting a second driving signal to operate the second drive mechanism. The first driving signal is corrected by the second driving signal and inputted to the first drive mechanism.

According to the construction, by correcting the first driving signal by the second driving signal, a driving force can be generated in the first drive mechanism in consideration of the movement of the optical base due to the reactive force of the movable member, and the influence of the driving of the movable member by the second drive mechanism exerted on the positioning of the objective lens can be reduced.

Moreover, in the optical pickup device of the invention, the correction may be achieved by an addition of a value derived from the second driving signal to the first driving signal.

According to the construction, a driving force capable of counterbalancing the acceleration of the optical base due to the reactive force of the movable member can be generated in surplus, and the influence of the movable member exerted on the positioning of the objective lens can be reduced.

Moreover, the value derived from the second driving signal may be a derivative value of the second driving signal in the optical pickup device of the invention.

According to the construction, the acceleration of the optical base due to the reactive force in driving the movable member is approximated to the derivative value of the driving signal of the second drive mechanism. Therefore, by adding the derivative value to the first driving signal, the driving force to counterbalance the amount of movement of the optical base can be added to the objective lens, and an error in the accuracy of positioning the objective lens due to the influence of the operation of the second drive mechanism can be reduced. Moreover, according to the construction, the derivative value of the second driving signal is merely added to the first driving signal, and this therefore leads to a simple construction, a small load of operation and high response.

Moreover, the movable member may move generally parallel to the moving direction of the objective lens in the optical pickup device of the invention.

According to the construction, the direction in which the reactive force of the movable member takes effect coincides with the direction in which the first drive mechanism is driven, and therefore, the reactive force of the movable member can be effectively canceled.

Moreover, the movable member may be an aberration correction lens or an expander lens in the optical pickup device of the invention.

Moreover, the optical pickup device of the invention is effective particularly in the case where the second drive mechanism is a friction drive actuator whose torque at the startup time is large.

Moreover, the optical pickup controller of the invention is the optical pickup controller, which controls the first drive mechanism to move the objective lens for condensing laser light onto the optical disk on the optical base and controls the second drive mechanism to move the movable member different from the objective lens on the optical base and includes first control means for outputting a first driving signal to operate the first drive mechanism and second control means for outputting a second driving signal to operate the second drive mechanism, and in which the first driving signal is corrected by the second driving signal and inputted to the first drive mechanism.

Moreover, the optical pickup control method of the invention is the optical pickup control method, which controls the first drive mechanism to move the objective lens for condensing laser light onto the optical disk on the optical base and the second drive mechanism to move the movable member different from the objective lens on the optical base and includes the processes of generating a first driving signal to operate the first drive mechanism, generating a second driving signal to operate the second drive mechanism, and adding a value derived from the second driving signal to the first driving signal and inputting the resultant to the first drive mechanism.

Figure 1:
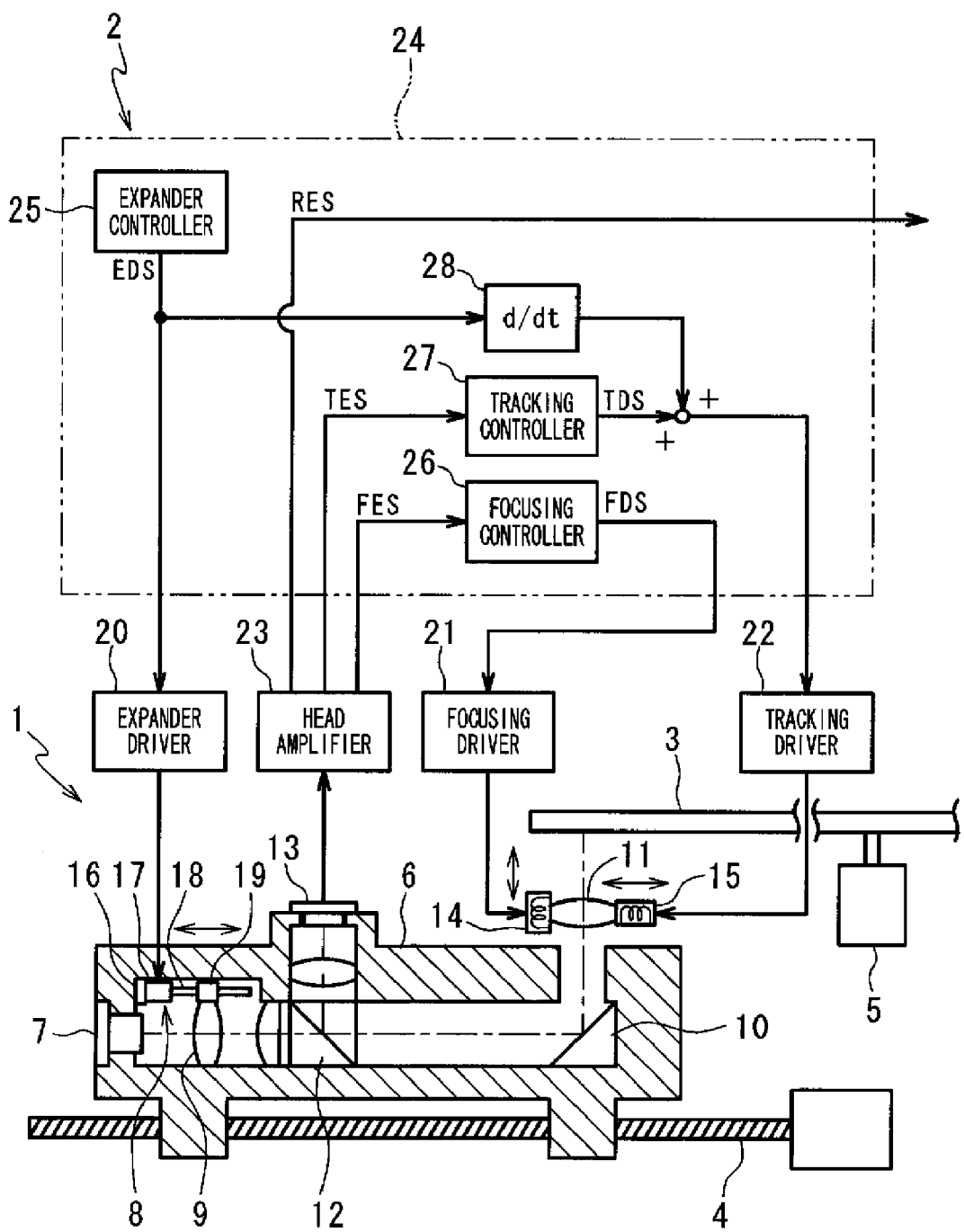
FIG. 1 is a schematic structural view of an optical disk apparatus having an optical pickup device according to a first embodiment of the invention.

EXPRESSIONS OF REFERENCE NUMERALS 1, 1': optical pickup device
2, 2': optical disk apparatus
3: optical disk
6: optical base
8: expander drive unit (second drive mechanism)
9: aberration correction lens (movable member)
11: objective lens
14: focusing actuator (first drive mechanism in second embodiment)
15: tracking actuator (first drive mechanism in first embodiment)
23: head amplifier (state detecting means)
24, 24': optical pickup controller
25: expander controller (second control means)
26: focusing controller (first control means in second embodiment)
27: tracking controller (first control means in first embodiment)
28: differentiator
EDS: expander driving signal (second driving signal)
FDS: focusing driving signal (first driving signal in second embodiment)
TDS: tracking driving signal (first driving signal in first embodiment)
FES: focusing error signal (detection signal in second embodiment)
TES: tracking error signal (detection signal in first embodiment)

DETAILED DESCRIPTION OF THE PREFERRED EMBODIMENTS

Embodiments of the invention will now be described with reference to the drawings.

FIG. 1 shows the construction of an optical disk apparatus 2 that has an optical pickup device 1 according to the first embodiment of the invention. The optical disk device 2 has an optical pickup device 1 that applies laser light to an optical disk 3 and reads reflected light, a pickup drive unit 4 that is a feed screw mechanism for positioning the optical pickup device 1 in the radial direction of the optical disk and a spindle motor 5 that rotates the optical disk 3.

In the optical pickup device 1, a laser light emitting element 7 that generates laser light, an aberration correction lens (movable member) 9 driven in the radial direction of the optical disk 3 by an expander actuator (second drive mechanism) 8, a mirror 10 that bends the laser light so that the laser light is perpendicularly incident on the optical disk 3, an objective lens 11 that condenses (focuses) the laser light on the optical disk, a half mirror 12 that takes out reflected light from the optical disk 3, and a light receiving element 13 that receives the taken reflected light and converts the light into an electrical signal are placed on one optical base 6. The objective lens 11 is retained movably in the optical axis direction by a focusing actuator 14 and movably in the radial direction of the optical disk 3 by a tracking actuator (first drive mechanism) 15.

The expander drive unit 8 is a frictional drive actuator, which is constructed of an anchor 16 fixed to the optical base 6, an electromechanical transducer 17 whose one end is fixed to the anchor, a driving friction member 18 fixed to the other end of the electromechanical transducer 17, and an engagement member 19 that is frictionally engaged with the driving friction member 18 and retains the aberration correction lens 9, and in which the engagement member 19 is slidably moved relative to the driving friction member 18 by the expansion and contraction of the electromechanical transducer 17.

The optical pickup device 1 has an expander driver 20 that drives the expander drive unit 8, a focusing driver 21 that drives the focusing actuator 14, and a tracking driver 22 that drives and the tracking actuator 15. The optical pickup device 1 has a reproduction signal RES that reproduces the recording data of the optical disk 3 from the output of the light receiving element 13, a focusing error signal FES that represents the deviation of the focus in the optical axis direction, and a head amplifier (state detecting means) 23 that calculates a tracking error signal (detection signal) TES representing the deviation of the laser light relative to the track of the optical disk 3 and outputs the signal. Further, the optical pickup device 1 has an optical pickup controller 24 that inputs a signal for instructing a driving force to the expander driver 20, the focusing driver 21 and the tracking driver 22.

The optical pickup controller 24 has an expander controller (second driving means) 25 that inputs an expander driving signal (second driving signal) EDS having a positive or negative voltage in accordance with the moving direction of the aberration correction lens 9 to the expander driver 20, a focusing controller 26 that outputs a focusing driving signal FDS that is a voltage signal proportional to the driving force to be added in the optical axis direction to the objective lens 11 (by, for example, PID control) to the focusing driver 21 on the basis of the focusing error signal FES of the head amplifier 23, and a tracking controller (first control means) 27 that outputs a tracking driving signal (first driving signal) TDS that is a voltage signal proportional to the driving force to be added in the radial direction to the objective lens 11 to the tracking driver 21 on the basis of the tracking error signal TES of the head amplifier 23.

The expander driving signal EDS outputted from the expander controller 25 instructs either stop of the aberration correction lens 9 or movement of the optical disk 3 in the radial direction of the optical disk 3. Then, the expander driver 20 moves the aberration correction lens 9 in the instructed direction by varying the duty ratio of the driving voltage applied to the electromechanical transducer 17 of the expander drive unit 8 in accordance with the expander driving signal EDS.

Further, the optical pickup controller 1 differentiates the expander driving signal EDS outputted from the expander controller 25 by the differentiator 28, adds the resultant to the tracking driving signal TDS of the tracking controller 27 and inputs the resulting signal to the tracking driver 22.

The focusing driver 21 and the tracking driver 22 output voltage signals that generate driving forces proportional to the voltage signals inputted to the focusing actuator 14 and the tracking actuator 15, respectively. That is, the tracking actuator 15 generates the driving force proportional to the derivative value of the expander driving signal EDS in addition to the driving force proportional to the tracking driving signal TDS.

Figure 2:
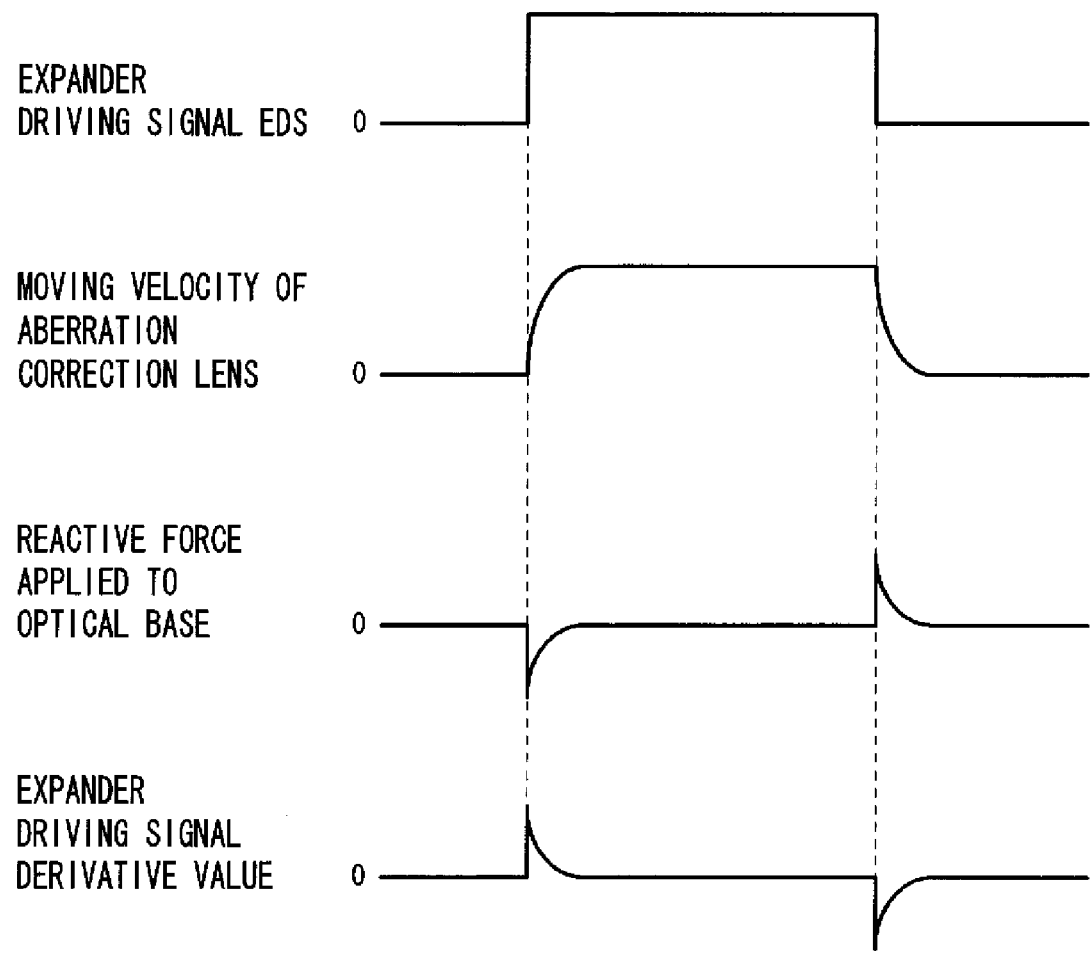
FIG. 2 is a chart showing a relation between a driving signal and a driving force in the optical pickup device of FIG. 1.

FIG. 2 shows a relation between the driving of the aberration correction lens 9 and the movement of the optical base 6 due to its reactive force in the present embodiment. As shown in the figure, when the expander driving signal EDS is outputted, the actual moving velocity of the aberration correction lens 9 causes a delay in the rise thereof due to its inertia. At this time, the reactive force received by the optical base 6 has a magnitude proportional to the derivative value (acceleration) of the actual moving velocity of the aberration correction lens 9 and a direction opposite to the acceleration direction of the aberration correction lens 9.

Moreover, the output of the differentiator 28 will be inexactly differentiated expander driving signal EDS as shown in the figure even if the differentiator 28 is constructed of a capacitor circuit or the output is obtained by calculation by a microcomputer.

As shown in the figure, the reactive force of the expander drive unit 8 taking effect on the optical base 6 will be generally inverted in polarity from the derivative value of the expander driving signal EDS. That is, the acceleration of the optical base 6 due to the reactive force of the expander drive unit 8 and the acceleration to be added in surplus to the objective lens 11 by the tracking actuator 15 by the derivative value of the expander driving signal EDS take effect so as to cancel each other. As a result, the tracking actuator 15 counterbalances the acceleration of the optical base 6 due to the movement of the aberration correction lens 9 to appropriately move the objective lens 11 in accordance with the amount of deviation of the tracking detected by the head amplifier 23, thereby allowing more accurate tracking to be achieved.

Figure 3:
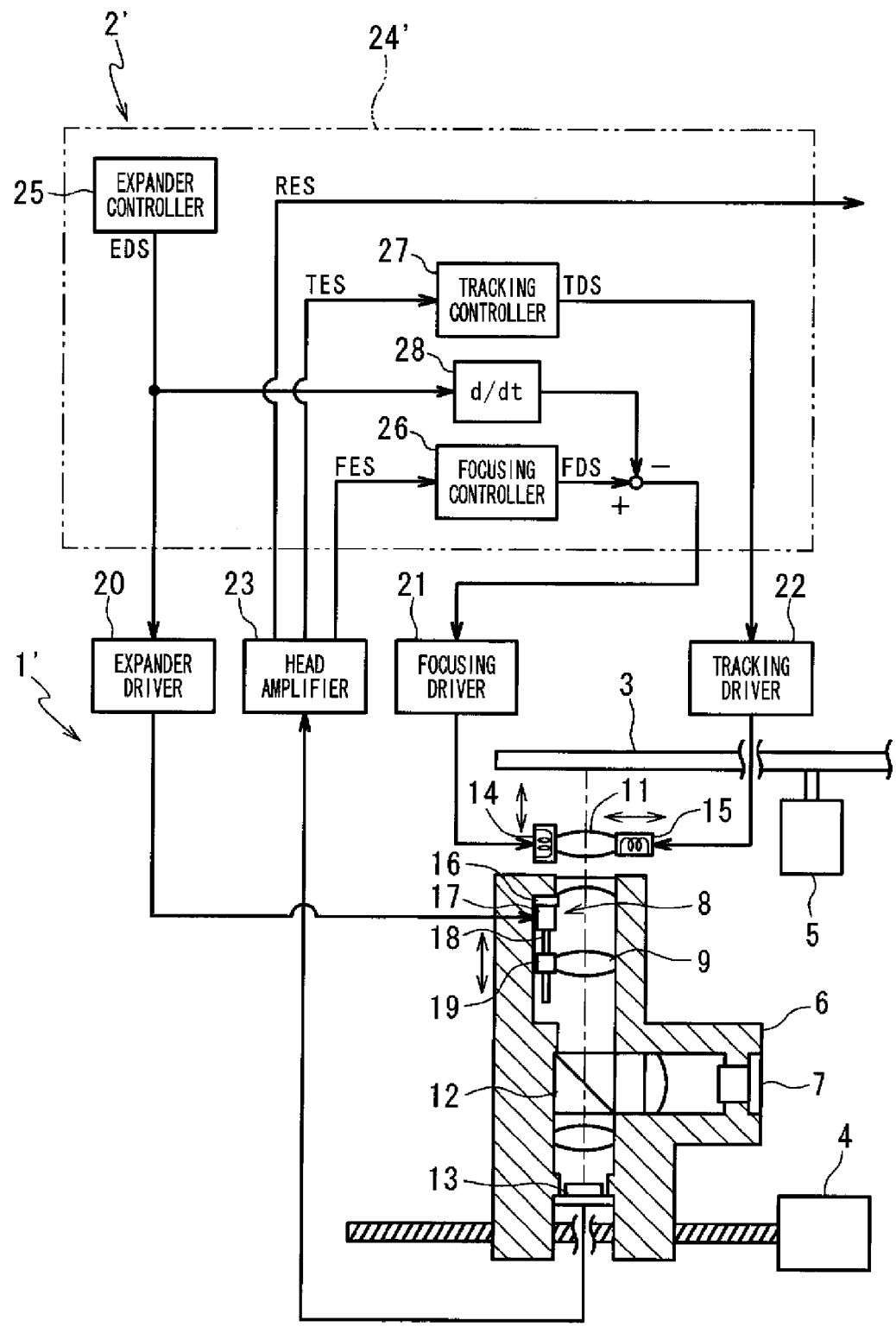
FIG. 3 is a schematic structural view of an optical disk apparatus having an optical pickup device according to a second embodiment of the invention.

Next, FIG. 3 shows an optical disk apparatus 2' that has an optical pickup 1' according to the second embodiment of the invention. In the description of the present embodiment, the same components as those of the first embodiment are designated by same reference numerals, and no description is provided therefor.

In the optical pickup device 1' of the present embodiment, the expander drive unit 8 drives the aberration correction lens 9 in the direction perpendicular to the optical disk 3 as in the direction in which the focusing actuator (second drive mechanism in the present embodiment) 14 is driven, and therefore, the optical base 6 receives the reactive force of the expander drive unit 8 in the direction perpendicular to the optical disk 3. Therefore, an optical pickup controller 24' of the optical pickup device 1' adds a value obtained by differentiating the expander driving signal EDS of the expander controller 25 by the differentiator 28 to the focusing driving signal (second driving signal in the present embodiment) FDS outputted from the focusing controller 26.

In the present embodiment, a forward direction in which the expander drive unit 8 drives the aberration correction lens 9 is opposite to a forward direction in which the focusing driver 21 drives the focusing actuator 14, and therefore, the derivative value of the expander driving signal EDS is inverted and added to the focusing driving signal FDS.

Although the invention is characterized in that the derivative value of the second driving signal (expander driving signal EDS) is added to the first driving signal (focusing driving signal FDS or the tracking driving signal TDS), the expression of "adding" includes inverted addition (subtraction) as described in the second embodiment. Moreover, in the invention, the "derivative value" includes not only mathematically simple differentiation but also amplification (gain), and it is needless to say that the gain of the differentiator 28 can be adjusted so that the acceleration of the optical base 6 by the expander drive unit 8 can be appropriately counterbalanced by the first drive mechanism.

By applying the invention particularly to an optical pickup device that employs a friction drive actuator whose torque at the startup time may be large like the expander actuator 8, errors in the position control of the objective lens 11 can be reduced. A truss actuator and the like are enumerated as other friction drive actuators.

The invention claimed is:

1. An optical pickup device comprising:
an objective lens that condenses laser light on an optical disk;
a first drive mechanism that moves the objective lens on an optical base;
a second drive mechanism that moves a movable member different from the objective lens on the optical base;
first control means for outputting a first driving signal to operate the first drive mechanism; and
second control means for outputting a second driving signal to operate the second drive mechanism,
wherein the first driving signal is corrected by the second driving signal and inputted to the first drive mechanism, the correction being to add a value derived from the second driving signal to the first driving signal and to input a result to the first drive mechanism.

2. The optical pickup device as claimed in claim 1, wherein the value derived from the second driving signal is a derivative value of the second driving signal.

3. The optical pickup device as claimed in claim 1, wherein the movable member moves generally parallel to a moving direction of the objective lens.

4. The optical pickup device as claimed in claim 1, wherein the movable member is an aberration correction lens.

5. The optical pickup device as claimed in claim 1, wherein the movable member is an expander lens.

6. The optical pickup device as claimed in claim 1, wherein the second drive mechanism is a friction drive actuator.

7. An optical pickup controller, which controls a first drive mechanism that moves an objective lens for condensing laser light onto an optical disk on an optical base, and controls a second drive mechanism that moves a movable member different from the objective lens on the optical base, wherein the controller comprises:
first control means for outputting a first driving signal to operate the first drive mechanism; and
second control means for outputting a second driving signal to operate the second drive mechanism, and
the first driving signal is corrected by the second driving signal and inputted to the first drive mechanism, the correction being to add a value derived from the second driving signal to the first driving signal and to input a resultant to the first drive mechanism.

8. The optical pickup controller as claimed in claim 7, wherein the value derived from the second driving signal is a derivative value of the second driving signal.

9. The optical pickup controller as claimed in claim 7, wherein the first driving signal is a tracking driving signal of the objective lens.

10. The optical pickup controller as claimed in claim 7, wherein the first driving signal is a focusing driving signal of the objective lens.

11. The optical pickup controller as claimed in claim 7, wherein the movable member moves generally parallel to a moving direction of the objective lens.

12. An optical pickup control method for controlling a first drive mechanism that moves an objective lens for condensing laser light onto an optical disk on an optical base, and a second drive mechanism that moves a movable member different from the objective lens on the optical base, the method comprising the steps of:
    generating a first driving signal to operate the first drive mechanism;
    generating a second driving signal to operate the second drive mechanism; and
    adding a value derived from the second driving signal to the first driving signal and inputting a resultant to the first drive mechanism.

13. The optical pickup control method as claimed in claim 12, wherein the value derived from the second driving signal is a derivative value of the second driving signal.

14. The optical pickup control method as claimed in claim 12, wherein the movable member moves generally parallel to a moving direction of the objective lens.

* * * * *